US012680486B1

(12) United States Patent
Hardman et al.

(10) Patent No.: US 12,680,486 B1
(45) Date of Patent: Jul. 14, 2026

(54) COLD START CATALYST BYPASS SYSTEM

(71) Applicant: FCA US LLC, Auburn Hills, MI (US)

(72) Inventors: Ken E Hardman, Auburn Hills, MI (US); James J. Daley, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/064,782

(22) Filed: Feb. 27, 2025

(51) Int. Cl.
*F01N 3/20* (2006.01)
*F02D 13/02* (2006.01)

(52) U.S. Cl.
CPC ....... *F01N 3/2053* (2013.01); *F02D 13/0242* (2013.01)

(58) Field of Classification Search
CPC ........................... F01N 3/2053; F02D 13/0242
See application file for complete search history.

(56) References Cited

U.S. PATENT DOCUMENTS

2023/0374926 A1* 11/2023 Brand .................. F16K 1/2007
2025/0137395 A1* 5/2025 Brand .................... F02B 37/18

* cited by examiner

*Primary Examiner* — Anthony Ayala Delgado
(74) *Attorney, Agent, or Firm* — Jeremy J. Klobucar

(57) ABSTRACT

An internal combustion engine system includes an internal combustion engine with a plurality of combustion chambers each having a main exhaust valve and a cold start exhaust valve, a main exhaust aftertreatment system with a main catalytic converter configured to receive exhaust gas from the internal combustion engine via the main exhaust valves and an exhaust manifold, and a light-off catalyst bypass system with a bypass passage and a bypass catalytic converter configured to selectively receive exhaust gas from the internal combustion engine via the cold start exhaust valves. A controller is programmed to determine a cold start, long idle, and/or low main catalytic converter temperature condition, deactivate the main exhaust valves to facilitate preventing exhaust gas flow through the exhaust manifold, and activate the cold start exhaust valves to enable exhaust gas flow through the bypass passage and the bypass catalytic converter.

20 Claims, 2 Drawing Sheets

COLD START CATALYST BYPASS SYSTEM

FIELD

The present application relates generally to vehicle engine exhaust treatment systems and, more particularly, to an internal combustion engine having a light-off catalyst bypass system.

BACKGROUND

In conventional internal combustion engine exhaust aftertreatment systems it is difficult to achieve low tailpipe emissions in the time immediately following a cold engine start due to low catalyst conversion efficiency of cold catalysts and poor combustion and cold engine conditions. In order to achieve acceptable conversion efficiency, the catalyst must surpass a predetermined light-off temperature. In some systems, faster light-off temperatures may be achieved, but often at the cost of high exhaust system backpressure, durability, longevity, cost, and/or complexity. Thus, while such conventional systems do work for their intended purpose, it is desirable to provide continuous improvement in the relevant art.

SUMMARY

In accordance with one example aspect of the invention, an internal combustion engine system is provided. In one example implementation, the engine system includes an internal combustion engine with a plurality of combustion chambers each having a main exhaust valve and a cold start exhaust valve, a main exhaust aftertreatment system with a main catalytic converter configured to receive exhaust gas from the internal combustion engine via the main exhaust valves and an exhaust manifold, and a light-off catalyst bypass system with a bypass passage and a bypass catalytic converter configured to selectively receive exhaust gas from the internal combustion engine via the cold start exhaust valves. A controller has one or more processors and a non-transitory computer-readable storage medium having a plurality of instructions stored thereon, which, when executed by the one or more processors, cause the one or more processors to perform operations comprising: determine a cold start, long idle, and/or low main catalytic converter temperature condition; deactivate the main exhaust valves to facilitate preventing exhaust gas flow through the exhaust manifold; and activate the cold start exhaust valves to enable exhaust gas flow through the bypass passage and the bypass catalytic converter.

In addition to the foregoing, the described engine system may include one or more of the following features: a turbocharger including a turbine configured to receive exhaust gas from the exhaust manifold; wherein the exhaust manifold is configured to supply exhaust gas through a main outlet duct and the turbine, and then to the main exhaust aftertreatment system and the main catalytic converter; wherein the bypass passage is configured to supply exhaust gas to a location in the main outlet duct upstream of the turbine; wherein the bypass passage is configured to supply exhaust gas to a location in a main exhaust conduit downstream of the turbine and upstream of the main catalytic converter; wherein each combustion chamber includes a main exhaust port selectively closed by the main exhaust valve, and a cold start exhaust port selectively closed by the cold start exhaust valve.

In addition to the foregoing, the described engine system may include one or more of the following features: wherein each cold start exhaust port is configured to supply exhaust gas to a cold start exhaust passage fluidly connected to the bypass passage; a switchable valvetrain configured to selectively deactivate the main exhaust valves and selectively deactivate the cold start exhaust valves; wherein deactivating the main exhaust valves moves the main exhaust valves to a closed position, and wherein deactivating the cold start exhaust valves moves the cold start exhaust valves to a closed position; and wherein the switchable valvetrain includes an exhaust camshaft operably associated with the main exhaust valves and the cold start exhaust valves.

In accordance with another example aspect of the invention, a method of operating an internal combustion engine system is provided. In one example implementation, the engine system includes an internal combustion engine with a plurality of combustion chambers each having a main exhaust valve and a cold start exhaust valve, a main exhaust aftertreatment system with a main catalytic converter configured to receive exhaust gas from the internal combustion engine via the main exhaust valves and an exhaust manifold, a light-off catalyst bypass system with a bypass passage and a bypass catalytic converter configured to selectively receive exhaust gas from the internal combustion engine via the cold start exhaust valves, and a controller configured to selectively activate/deactivate the main exhaust valves and the cold start exhaust valves.

In one example, the method includes monitoring, by the controller, a temperature of the main catalytic converter to determine if the temperature is below a predetermined light-off temperature; deactivating, by the controller, the main exhaust valves when the main catalytic converter is below the predetermined light-off temperature, to thereby facilitate preventing exhaust gas flow through the exhaust manifold; and activating, by the controller, the cold start exhaust valves when the main catalytic converter is below the predetermined light-off temperature, to thereby enable exhaust gas flow through the bypass passage and the bypass catalytic converter.

In addition to the foregoing, the described method may include one or more of the following features: activating, by the controller, the main exhaust valves when the main catalytic converter has reached the predetermined light-off temperature, to thereby enable exhaust gas flow through the exhaust manifold, and deactivating, by the controller, the cold start exhaust valves when the main catalytic converter has reached the predetermined light-off temperature, to thereby facilitate preventing exhaust gas flow through the bypass passage and the bypass catalytic converter; wherein the internal combustion engine system further comprises a turbocharger including a turbine configured to receive exhaust gas from the exhaust manifold; and wherein the exhaust manifold is configured to supply exhaust gas through a main outlet duct and the turbine, and then to the main exhaust aftertreatment system and the main catalytic converter.

In addition to the foregoing, the described method may include one or more of the following features: wherein the bypass passage is configured to supply exhaust gas to a location in the main outlet duct upstream of the turbine; wherein the bypass passage is configured to supply exhaust gas to a location in a main exhaust conduit downstream of the turbine and upstream of the main catalytic converter; wherein each combustion chamber includes a main exhaust port selectively closed by the main exhaust valve, and a cold start exhaust port selectively closed by the cold start exhaust valve; wherein each cold start exhaust port is configured to supply exhaust gas to a cold start exhaust passage fluidly connected to the bypass passage; wherein the internal combustion engine system further includes a switchable valvetrain configured to selectively deactivate the main exhaust valves and selectively deactivate the cold start exhaust valves; and wherein deactivating the main exhaust valves moves the main exhaust valves to a closed position, and wherein deactivating the cold start exhaust valves moves the cold start exhaust valves to a closed position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
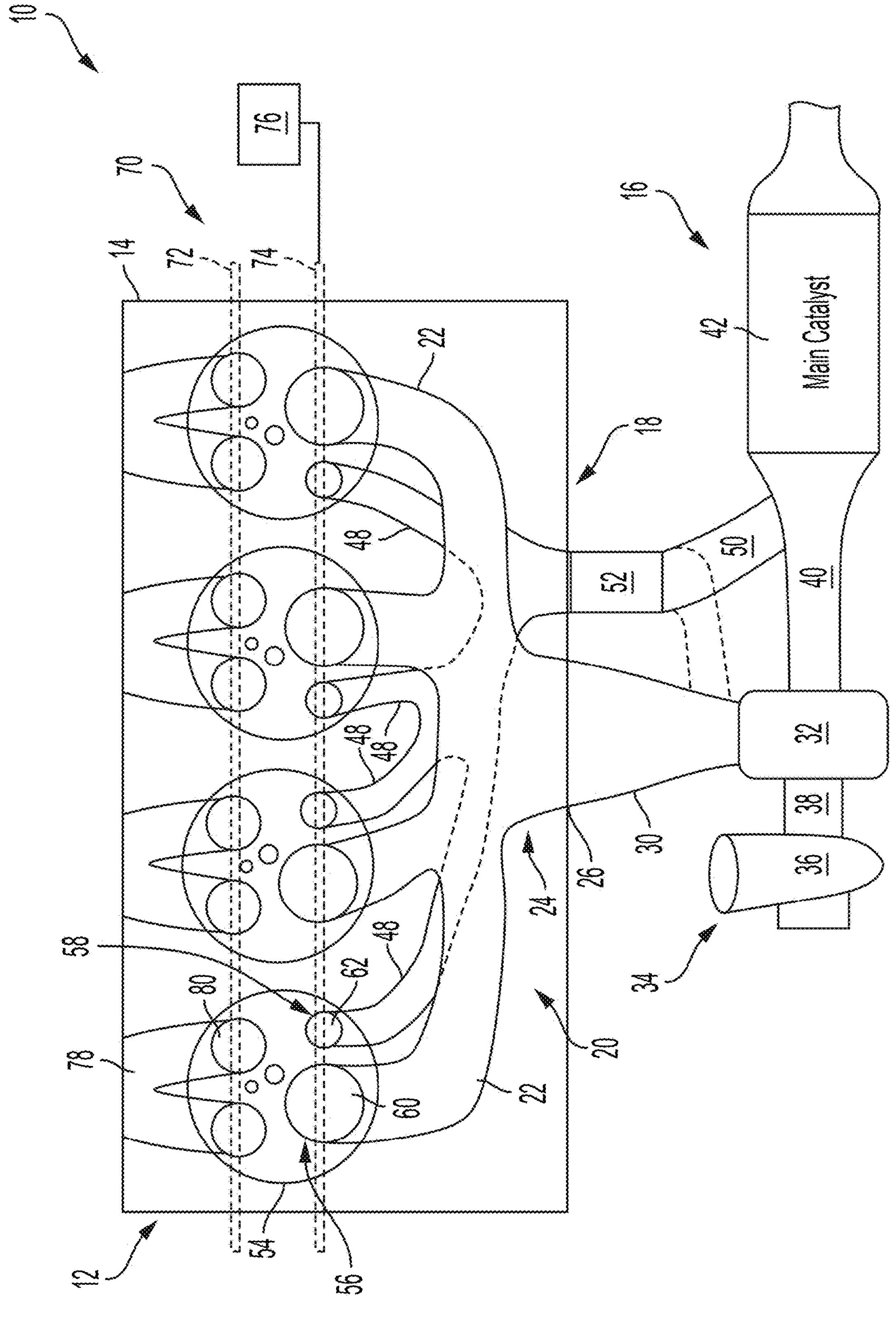
FIG. 1 is a schematic illustration of an example internal combustion engine system with a light-off catalyst bypass system, in accordance with the principles of the present application.

Some conventional aftertreatment systems have limited or no capacity to get the catalyst to a light-off temperature for efficient conversion of harmful exhaust constituents before approximately fifteen seconds post cold start in a turbocharged system. Every second the engine is running and the catalyst is not at or above light-off temperature, exhaust gas constituents such as CO, CO2, O2, HC, NMHC and NOx are not being converted efficiently. The short time preceding the catalyst light-off is responsible for a very large portion of the CO, HC, and NOx breakthrough for on and off cycle starts and long idles. In conventional systems, one or more catalysts are traditionally located some distance downstream of the exhaust outlet and/or turbocharger outlet and are typically in the main exhaust flow for the entire useful life of the vehicle.

As the distance, wetted surface area, and thermal mass located between the exhaust ports and catalyst face increases, it becomes increasingly difficult to have the catalyst light-off in a timely manner. Common hardware designs to decrease time to light-off include decreasing distance to the catalyst. However, this often comes at the expense of the life of the catalyst because of higher temperature, gas velocities, and thermal gradients. Further, as a catalyst is subjected to exhaust flow, high temperatures, and/or unwanted chemicals, it slowly loses capacity for efficient conversion (catalyst aging). Conventional systems typically account for this catalyst aging by increasing precious metal loading, catalyst volume, and catalyst surface area, which can potentially be a resource burden and increase cost and complexity of the systems.

Accordingly, described herein are systems and methods for a catalyst bypass system for improving tailpipe emissions during operation of an internal combustion engine. The system utilizes a light-off catalyst bypass system with an additional integrated catalyst. During system operation, the exhaust gas is routed directly to one or more bypass catalysts before it re-enters the main exhaust path. This will allow for rapid catalyst light-off of the bypass catalyst and improved conversion of harmful exhaust constituents.

In the example embodiments, the light-off catalyst bypass system is configured to reduce heat loss during a cold start or light load operation to ensure improved tailpipe emissions while the main catalyst is coming up to temperature. An engine valve system is configured to flow all of the cold start combustion gases into an auxiliary catalyst by activating a set of small cold start exhaust valves and deactivating larger normal operation exhaust valves. After the cold start phase is complete and the main catalytic converter (main catalyst) has reached a predetermined minimum operating (light-off) temperature, the cold start exhaust valves are deactivated and the normal operation exhaust valves are activated for the rest of the engine operation. Valvetrain switching mechanisms such as, for example, collapsing rockers, collapsing lash adjuster, or lobe switching can be utilized for the valve activation and deactivation. Additionally, a unique control strategy may be used to optimize both combustion control and exhaust valve control to minimize emissions (e.g., HC, NOx, particulates, etc.).

Due to its small size and low surface area/distance between it and the exhaust valves, the bypass catalyst warms up much quicker than the conventional catalyst. During a cold engine start up event or other situation where it is desirable to have the exhaust gas flow through the catalyst bypass system, the normal exhaust valves are closed (deactivated) to restrict flow to the turbine and route the exhaust gas through the light-off catalyst bypass system. Restricting flow from going directly to the turbine and to the conventional catalyst during cold start is desirable because the conventional catalyst cannot effectively convert exhaust constituents before it reaches a minimum or catalyst "light-off" temperature. The gas exiting the bypass catalyst is then directed to the main catalyst to assist it in achieving a quicker light-off.

In the example embodiment, the system has two main modes/positions, a bypass mode/position and a normal or default mode/position. The bypass position is enabled when the normal exhaust valves restrict/prevent main exhaust flow through the turbine and the exhaust gases are routed through the bypass catalyst system via the cold start exhaust valves. The default position is enabled when the cold start exhaust valves are closed and the main exhaust flows through the normal exhaust valves. Once the main catalyst light-off is achieved, the valves can begin actuating to the default position.

Advantages of the system include: extremely fast catalyst light-off times, the ability to selectively drive most or all of the exhaust flow through a bypass catalyst before going through the main exhaust path; extremely short distance, surface area, and thermal mass between the cold start exhaust ports and the bypass catalyst via bypassing the turbocharger turbine; the ability to deactivate the bypass catalyst after light-off; extremely high cell density substrate in the catalyst that would not be used in a non-bypassable system due to excessive backpressure; and the ability to move PGM (platinum group metals) away from the main catalyst and onto the bypass catalyst for better PGM utilization.

After rapid light-off, the catalyst begins effectively converting exhaust constituents via exothermic reactions and producing more exhaust heat, which assists in heating up the main catalyst. Once the main catalyst reaches light-off temperature, the cold start exhaust valves can be closed to block off the bypass catalyst and the conventional exhaust flow can continue. Selective deactivation of the bypass catalyst system provides benefits for both the bypass and main catalyst.

In one example, the bypass catalyst can have high precious metal loading with high cell density substrate so that it has very high conversion efficiency at cold start. Such a high cell density substrate could potentially cause significant exhaust backpressure in a conventional system, as well as speed aging due to continuous exposure to high exhaust temperatures and flows. Neither backpressure nor aging are concerns in the described system since the auxiliary bypass catalyst can be bypassed outside of cold start conditions. Similarly, the main catalyst can use fewer precious metals since it is not relied upon for cold start emissions. Precious metal loading of the main (and much larger) catalyst can make up a significant cost of the emissions system and is also responsible for aging or performance degradation of the emissions system during its full useful life. As such, the system allows for increased emission system efficacy with decreased degradation due to aging.

However, as previously discussed, operating in the cold start bypass mode restricts main exhaust flow through the turbine and the exhaust gases are routed through the bypass catalyst system, which limits engine torque and power. Accordingly, in some situations, if a driver requests a high torque, the bypass system will be disabled or “kicked out” (e.g., cold start exhaust valves closed) to allow exhaust flow through the turbine to deliver the requested torque.

With initial reference to FIG. 1, an internal combustion engine system 10 having an internal combustion engine 12 with a cylinder head 14 is illustrated in accordance with the principles of the present application. In the example embodiment, the cylinder head 14 is configured to selectively supply exhaust gas to a main exhaust aftertreatment system 16 and a light-off catalyst bypass system 18. As described herein in more detail, the light-off catalyst bypass system 18 is selectively utilized during cold start, long idle, and/or cold catalyst conditions to rapidly heat to light-off temperatures to quickly achieve low tailpipe emissions.

As shown in FIG. 1, the engine system 10 further includes an exhaust manifold 20 having a plurality of cylinder exhaust passages 22 that merge together to form a collector portion or main exhaust passage 24 having an outlet 26. In some embodiments, the exhaust manifold 20 may be coupled (e.g., bolted) to the cylinder head 14 or alternatively integrated therein. A main outlet duct 30 receives exhaust gas from the manifold outlet 26 and is configured to direct the exhaust gas to the main exhaust aftertreatment system 16. In the illustrated example, the main outlet duct 30 configured to provide exhaust gas to a charger device, such as a turbine 32 of a turbocharger 34. In the example embodiment, the system includes turbocharger 34 with the turbine 32 rotatably coupled to a compressor 36 via a shaft 38. It will be appreciated that the charger device may be a supercharger rather than a turbocharger, or engine 12 may not include a charger device such that main outlet duct 30 is directly connected to the main exhaust aftertreatment system 16.

In the example embodiment, the main exhaust aftertreatment system 16 generally includes a main exhaust conduit 40 having one or more main catalytic converters 42 to reduce or convert a desired exhaust gas constituent such as, for example, carbon monoxide (CO), hydrocarbon (HC), and/or nitrogen oxides (NOx). The main exhaust conduit 40 is fluidly coupled to the exhaust manifold main outlet 26 (optionally via the turbocharger turbine 32) and is configured to receive exhaust gas from the vehicle engine 12 and supply the exhaust gas to the main catalytic converter 42. In order to efficiently reduce or convert CO, HC, and NOx, the main catalytic converter 42 must reach a predetermined light-off temperature. However, during some vehicle operations such as cold starts, the main catalytic converter 42 is below light-off temperature and therefore has a low catalyst conversion efficiency.

In order to efficiently reduce or convert the unwanted exhaust gas constituents while the main catalytic converter 42 is below the light-off temperature, the vehicle utilizes the light-off catalyst bypass system 18, which generally includes a plurality of cold start exhaust passages 48 that converge into a bypass passage 50 having a bypass catalytic converter (“bypass catalyst”) 52. The light-off catalyst bypass system 18 is configured to redirect at least a portion of the exhaust gas from engine combustion chambers 54, into the cold start exhaust passages 48 and bypass passage 50, and through the auxiliary bypass catalyst 52.

In the example embodiment, each combustion chamber 54 includes a main exhaust port 56 and a cold start exhaust port 58. The main exhaust port 56 is selectively closed (blocked) by a main exhaust valve 60 (e.g., poppet valve). In this way, in a closed position, the exhaust valve 60 prevents flow of exhaust gas from the combustion chamber 54 into the associated cylinder exhaust passage 22. In an open position, the exhaust valve 60 allows exhaust gas to flow from the combustion chamber 54 into the cylinder exhaust passage 22. Similarly, the cold start exhaust port 58 is selectively closed by a cold start exhaust valve 62 (e.g., poppet valve). In one example, the cold start exhaust valves 62 have a smaller valve head diameter than the main exhaust valves 60. In this way, in a closed position, the cold start exhaust valve 62 prevents flow of exhaust gas from the combustion chamber 54 into the associated cold start exhaust passage 48. In an open position, the cold start exhaust valve 62 allows exhaust gas to flow from the combustion chamber 54 into the cold start exhaust passage 48. The exhaust gas then passes through the bypass catalyst 52 before being directed to the main exhaust conduit 40 in a location upstream of the main catalyst 42. Alternatively, bypass passage 50 (shown in phantom) may direct the exhaust gas to the main outlet duct 30 in a location upstream of the turbine 32.

Because the bypass catalyst 52 is located close to the cylinder head 14, it is in close proximity to the engine combustion chambers 54 and receives the exhaust gas quicker and at a higher temperature than the main catalytic converter 42 would. Thus, the bypass catalyst 52 is rapidly heated to its predetermined light-off temperature to achieve high catalyst conversion efficiency before the main catalytic converter 42 alone. It will be appreciated that the light-off catalyst bypass system 18 may have various configurations and be integrated with or into the cylinder head 14 in various manners.

In one example, the bypass catalyst 52 is a three-way catalyst configured to remove CO, HC, and NOx from the exhaust gas passing therethrough, as described herein in more detail. However, it will be appreciated that bypass catalyst 52 may be any suitable catalyst that enables light-off catalyst bypass system 18 to remove any desired pollutant or compound such as, for example, a hydrocarbon trap or a four-way catalyst. In another example, bypass catalyst 52 has a cell density of between approximately 800 and approximately 1200 cells per square inch, or between 800 and 1200 cells per square inch.

With continued reference to FIG. 1, the engine system 10 also includes a valvetrain 70 that includes an intake camshaft 72 and an exhaust camshaft 74. The exhaust camshaft 74 is operably associated with the main exhaust valves 60 and the cold start exhaust valves 62. A controller 76 (e.g., engine control unit) is in signal communication with the valvetrain 70 and configured to operate the exhaust camshaft 74 to separately and selectively activate and deactivate both the main exhaust valves 60 and the cold start exhaust valves 62. For example, in a normal engine operation mode, the controller 76 activates the main exhaust valves 60 and deactivates the cold start exhaust valves 62. In a cold start engine mode, the controller 76 deactivates the main exhaust valves 60 and activates the cold start exhaust valves 62. In order to activate/deactivate the exhaust valves 60, 62, the valvetrain 70 may include any suitable switching mechanisms such as, for example, collapsing rockers, collapsing lash adjusters, lobe switchers, etc.

In the normal engine operation, intake air passes through compressor 36 and is supplied to the engine intake via intake passages 78. The intake camshaft 72 is configured to control a timing of the opening and closing of engine intake valves 80, and the exhaust camshaft 74 is configured to control a timing of the opening and closing of main exhaust valves 60 or the cold start exhaust valves 62.

In the example embodiment, the light-off catalyst bypass system 18 is configured to selectively operate in (i) a normal or warm catalyst mode and (ii) a cold light-off catalyst mode (CLOC mode). In the warm catalyst mode, controller 76 determines the main catalytic converter 42 has reached the predetermined light-off temperature (e.g., via temperature sensor, modeled, etc.) and controls the valvetrain 70 to activate the main exhaust valves 60 and deactivate (e.g., close) the cold start exhaust valves 62. In this mode, the closed cold start exhaust valves 62 facilitate preventing the exhaust gas in the combustion chambers 54 from entering the bypass passage 50 and thus bypass catalyst 52. Instead, the exhaust gas is directed through main exhaust passage 24, the turbocharger turbine 32 (if present), into the main exhaust conduit 40, and through the main catalytic converter 42 before being exhausted to the atmosphere.

In the cold catalyst mode, controller 76 determines the main catalytic converter 42 is below the predetermined light-off temperature (e.g., a cold start), and subsequently controls the valvetrain 70 to deactivate (e.g., close) the main exhaust valves 60 and activate the cold start exhaust valves 62. In this mode, the cold start exhaust valves 62 enable the exhaust gas in the combustion chambers 54 to be directed through bypass passage 50 and bypass catalyst 52 before being directed to the main exhaust conduit 40 and atmosphere. Once the main catalytic converter 42 has reached the light-off temperature, the controller 76 may then switch the light-off catalyst bypass system 18 to the normal mode.

Figure 2:
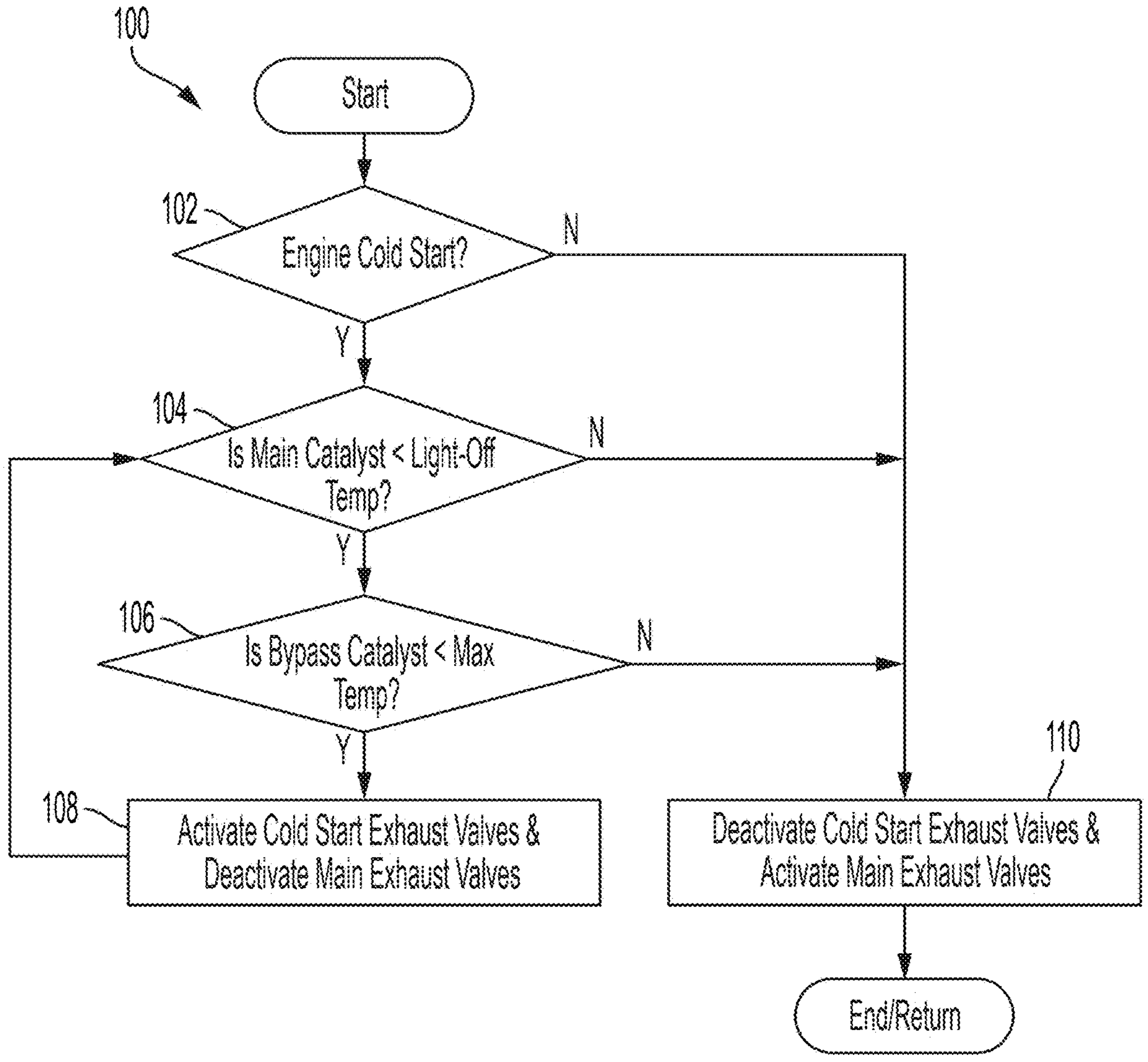
FIG. 2 is a flow control diagram of an example method of operating the engine system shown in FIG. 1, in accordance with the principles of the present application.

With reference now to FIG. 2, a flow diagram of an example method 100 of operating engine system 10 is illustrated. While the components of engine system 10 are specifically referenced for illustrative/descriptive purposes, it will be appreciated that the method 100 could be applicable to any suitable vehicle or engine system. The method begins at 102 where the controller 76 ("control") determines if the engine system 10 is under a cold start or low temperature condition. This may be determined, for example, by one or more temperature sensors, modeling, or other suitable means. If yes, control proceeds to 104. If no, control proceeds to 110 and activates the main exhaust valves 60 and deactivates the cold start exhaust valves 62 (if not done already). Control may then end or return to 102.

At 104, control determines if a temperature of the main catalyst 42 is less than a predetermined light-off temperature thereof. This may be determined, for example, from a temperature sensor, model, or other suitable input (not shown). If no, control proceeds to 110 and operates as previously described. If yes, control proceeds to 106 and determines if a temperature of the bypass catalyst 52 is less than a predetermined maximum temperature of the bypass catalyst 52 (e.g., to prevent catalyst damage). This may be determined, for example, from a temperature sensor, model, or other suitable input (not shown). If no, control proceeds to 110 and operates as previously described. If yes, control proceeds to 108 and activates the cold start exhaust valves 62 and deactivates the main exhaust valves 60. This allows exhaust gas to be directed through the bypass passage 50 to rapidly warm the bypass catalyst 52 to its light-off temperature, and thereby begin reducing emissions faster than the larger main catalyst 42. Control then returns to 104 and operates as previously described.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An internal combustion engine system, comprising:

an internal combustion engine with a plurality of combustion chambers each having a main exhaust valve and a cold start exhaust valve;

a main exhaust aftertreatment system with a main catalytic converter configured to receive exhaust gas from the internal combustion engine via the main exhaust valves and an exhaust manifold;

a light-off catalyst bypass system with a bypass passage and a bypass catalytic converter configured to selectively receive exhaust gas from the internal combustion engine via the cold start exhaust valves; and a controller having one or more processors and a non-transitory computer-readable storage medium having a plurality of instructions stored thereon, which, when executed by the one or more processors, cause the one or more processors to perform operations comprising:

determine a cold start, long idle, and/or low main catalytic converter temperature condition;

deactivate the main exhaust valves to facilitate preventing exhaust gas flow through the exhaust manifold; and activate the cold start exhaust valves to enable exhaust gas flow through the bypass passage and the bypass catalytic converter.

2. The internal combustion engine system of claim 1, further comprising a turbocharger including a turbine configured to receive exhaust gas from the exhaust manifold.

3. The internal combustion engine system of claim 2, wherein the exhaust manifold is configured to supply exhaust gas through a main outlet duct and the turbine, and then to the main exhaust aftertreatment system and the main catalytic converter.

4. The internal combustion engine system of claim 3, wherein the bypass passage is configured to supply exhaust gas to a location in the main outlet duct upstream of the turbine.

5. The internal combustion engine system of claim 3, wherein the bypass passage is configured to supply exhaust gas to a location in a main exhaust conduit downstream of the turbine and upstream of the main catalytic converter.

6. The internal combustion engine system of claim 1, wherein each combustion chamber includes:

a main exhaust port selectively closed by the main exhaust valve; and a cold start exhaust port selectively closed by the cold start exhaust valve.

7. The internal combustion engine system of claim 6, wherein each cold start exhaust port is configured to supply exhaust gas to a cold start exhaust passage fluidly connected to the bypass passage.

8. The internal combustion engine system of claim 1, further comprising a switchable valvetrain configured to selectively deactivate the main exhaust valves and selectively deactivate the cold start exhaust valves.

9. The internal combustion engine system of claim 8, wherein deactivating the main exhaust valves moves the main exhaust valves to a closed position, and wherein deactivating the cold start exhaust valves moves the cold start exhaust valves to a closed position.

10. The internal combustion engine system of claim 8, wherein the switchable valvetrain includes an exhaust camshaft operably associated with the main exhaust valves and the cold start exhaust valves.

11. A method of operating an internal combustion engine system that comprises:

an internal combustion engine with a plurality of combustion chambers each having a main exhaust valve and a cold start exhaust valve;

a main exhaust aftertreatment system with a main catalytic converter configured to receive exhaust gas from the internal combustion engine via the main exhaust valves and an exhaust manifold;

a light-off catalyst bypass system with a bypass passage and a bypass catalytic converter configured to selectively receive exhaust gas from the internal combustion engine via the cold start exhaust valves; and a controller configured to selectively activate/deactivate the main exhaust valves and the cold start exhaust valves, the method comprising:

monitoring, by the controller, a temperature of the main catalytic converter to determine if the temperature is below a predetermined light-off temperature;

deactivating, by the controller, the main exhaust valves when the main catalytic converter is below the predetermined light-off temperature, to thereby facilitate preventing exhaust gas flow through the exhaust manifold; and activating, by the controller, the cold start exhaust valves when the main catalytic converter is below the predetermined light-off temperature, to thereby enable exhaust gas flow through the bypass passage and the bypass catalytic converter.

12. The method of claim 11, further comprising:

activating, by the controller, the main exhaust valves when the main catalytic converter has reached the predetermined light-off temperature, to thereby enable exhaust gas flow through the exhaust manifold; and deactivating, by the controller, the cold start exhaust valves when the main catalytic converter has reached the predetermined light-off temperature, to thereby facilitate preventing exhaust gas flow through the bypass passage and the bypass catalytic converter.

13. The method of claim 11, wherein the internal combustion engine system further comprises a turbocharger including a turbine configured to receive exhaust gas from the exhaust manifold.

14. The method of claim 13, wherein the exhaust manifold is configured to supply exhaust gas through a main outlet duct and the turbine, and then to the main exhaust aftertreatment system and the main catalytic converter.

15. The method of claim 14, wherein the bypass passage is configured to supply exhaust gas to a location in the main outlet duct upstream of the turbine.

16. The method of claim 14, wherein the bypass passage is configured to supply exhaust gas to a location in a main exhaust conduit downstream of the turbine and upstream of the main catalytic converter.

17. The method of claim 11, wherein each combustion chamber includes:

a main exhaust port selectively closed by the main exhaust valve; and a cold start exhaust port selectively closed by the cold start exhaust valve.

18. The method of claim 17, wherein each cold start exhaust port is configured to supply exhaust gas to a cold start exhaust passage fluidly connected to the bypass passage.

19. The method of claim 11, wherein the internal combustion engine system further includes a switchable valvetrain configured to selectively deactivate the main exhaust valves and selectively deactivate the cold start exhaust valves.

20. The method of claim 19, wherein deactivating the main exhaust valves moves the main exhaust valves to a closed position, and wherein deactivating the cold start exhaust valves moves the cold start exhaust valves to a closed position.

* * * * *